(12) United States Patent
Baughman

(10) Patent No.: US 8,607,355 B2
(45) Date of Patent: Dec. 10, 2013

(54) SOCIAL NETWORK PRIVACY USING MORPHED COMMUNITIES

(75) Inventor: Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/031,376

(22) Filed: Feb. 21, 2011

(65) Prior Publication Data

US 2012/0216287 A1 Aug. 23, 2012

(51) Int. Cl.
*G06F 21/00* (2013.01)

(52) U.S. Cl.
USPC .......... 726/26; 726/27; 726/28; 726/29; 726/30; 709/203; 709/217; 709/218; 709/219; 713/150

(58) Field of Classification Search
USPC ............ 726/26–33; 713/182–186; 709/203, 709/217–219
See application file for complete search history.

(56) References Cited

U.S. PATENT DOCUMENTS

| | | | | |
|---|---|---|---|---|
| 7,738,660 B2* | 6/2010 | Scheidt et al. | | 380/258 |
| 8,170,216 B2* | 5/2012 | Vishnu et al. | | 380/286 |
| 2001/0056410 A1* | 12/2001 | Ishigaki | | 705/67 |
| 2009/0303237 A1 | 12/2009 | Liu et al. | | |
| 2009/0313370 A1* | 12/2009 | Rhoads | | 709/224 |
| 2010/0020966 A1* | 1/2010 | Hata et al. | | 380/44 |
| 2010/0185630 A1 | 7/2010 | Cheng et al. | | |
| 2012/0030193 A1* | 2/2012 | Richberg et al. | | 707/719 |
| 2012/0079023 A1* | 3/2012 | Tejada-Gamero et al. | | 709/204 |

OTHER PUBLICATIONS

Xiaowei Ying, et al., On Link Privacy in Randomizing Social Networks, Advances in Knowledge Discovery and Data Mining, Lecture Notes in Computer Science, 2009, vol. 5476/2009, 28-39, Springerlink.
Yin et al.: "A Probabilistic Model for Personalized Tag Prediction", Department of Computer Science & Engineering, Lehigh University, Jul. 25-28, 2010, pp. 959-968.
Liu et al.: "BioSnowball: Automated Population of Wikis", Jul. 25-28, 2010, pp. 969-978.
Leroy et al.: "Cold Start Link Prediction", Jul. 25-28, 2010, pp. 393-402.
Sarangi et al.: "DUST: A Generalized Notion of Similarity between Uncertain Time Series", Jul. 25-28, 2010, pp. 383-392.
Grandison et al.: "Towards Privacy Propagation in the Social Web", IBM Almaden Research Center, 2pgs, 2008.
Plangprasopchok et al.: "Growing a Tree in the Forest: Constructing Folksonomies by Integrating Structured Metadata", Jul. 25-28, 2010, pp. 949-958.
Lin et al.: "PET: A Statistical Model for Popular Events Tracking in Social Communities", Jul. 25-28, 2010, pp. 929-938.

(Continued)

*Primary Examiner* — Norshed Mehedi
*Assistant Examiner* — Josnel Jeudy
(74) *Attorney, Agent, or Firm* — Douglas A. Lashmit; Hoffman Warnick LLC

(57) ABSTRACT

A system, method and program product for morphing social network data. A system is disclosed that includes: a system for splitting up M communities within a set of social network data into N split communities; a system for morphing the N split communities into P morphed communities using a cardinality key, wherein the cardinality key causes subsets of split communities to be unioned together; and a system for adding phony members into the P morphed communities.

14 Claims, 7 Drawing Sheets

(56) References Cited

OTHER PUBLICATIONS

Liu et al.: :A Framework for Computing the Privacy Scores of Users in Online Social Networks, 10pgs, 2009.
Liu et al.: Chapter 1 "Privacy-Preserving Data Analysis on Graphs and Social Networks", 22pgs, 2008.
Liu et al.: "Towards Identity Anonymization on Graphs", Jun. 9-12, 2008, 14pgs.
Maximilien et al.: "Enabling Privacy as a Fundamental Construct for Social Networks", 8pgs, 2009.
Maximilien et al.: "Privacy-as-a-Service: Models, Algorithms, and Results on the Facebook Platform", May 21, 2012.
Lichtenwalter et al.: "New Perspectives and Methods in Link Prediction", 10pgs, 2010.
Wen et al.: "On the Quality of Inferring Interests from Social Neighbors", 9pgs, 2010.
Lin et al.: "Privacy-Preserving Outsourcing Support Vector Machines with Random Transformation", Jul. 25-28, 2010, 10pgs.
Roth et al. "Suggesting Friends Using the Implicit Social Graph", Jul. 25-28, 2010, 9pgs.
Sozio et al.: "The Community-Search Problem and How to Plan a Successful Cocktail Party", Jul. 25-28, 2010, 10pgs.
Zhang et al.: "Versatile Publishing for Privacy Preservation", Jul. 25-28, 2010, 10pgs.
Vuokko et al.: "Reconstructing Randomized Social Networks", 11pgs, 2010.

* cited by examiner

Data with Randomly Split Communities 20

| Community 1 (A1) | Community 2 (A2) |
| Members: c | Members: g |

| Community 3 (A3) | Community 4 (C1) |
| Members: d, f | Members: a, d |

| Community 5 (B1) | Community 6 (B2) |
| Members: d, f | Members: e |

| Community 7 (D1) | Community 8 (D2) |
| Members: c | Members: a, b |

Figure 4

$$[1 2 3 4 5 6 7 8] \begin{bmatrix} 0&0&0&1&1&0&0&0 \\ 1&0&1&0&0&1&0&0 \\ 0&0&0&0&0&0&0&0 \\ 0&0&0&0&0&0&0&0 \\ 0&1&0&0&0&0&1&0 \\ 0&0&0&0&0&0&0&0 \\ 0&0&0&0&0&0&0&0 \\ 0&0&0&0&0&0&0&1 \end{bmatrix} = [2 5 2 1 1 2 5 8]$$

Morphed Communities 24

Community 2' = community 1 U community 3 U community 6
    members: c, d, e, f

Community 5' = community 2 U community 7
    members: c, g

Community 1' = community 4 U community 5
    members: a, d, d, f

Community 8' = community 8
    members: a, b

Figure 6

Morphed Communities with Randomly Added Members 26

Community 2' = members: c, d, e, f, x

Community 5' = members: c, g

Community 1' = members: a, d, d, f, w, x, y, z

Community 8' = members: a, b, z

Figure 7

SOCIAL NETWORK PRIVACY USING MORPHED COMMUNITIES

BACKGROUND

The present invention relates to maintaining social network privacy and more particularly providing identity anonymization within the context of a social network by implementing noninvertible morphed communities.

The ability to provide identity anonymization within the context of a social network has become a significant challenge. For example, even though an individual's actual identity and details may be secure within a social network (i.e., the user may simply be known via a screen name), the identity of the user could still be deduced based on relationships the user may have. Even if identity or features that could be used to infer the details about an individual are hidden, the cardinality (i.e., number) of features or links within a graph can be used to infer the identity of an individual. For example, if a user belongs to a given community, the member will be connected to a certain number of records. The number of connections that a user maintains to a community as well as to other communities could increase the likelihood of determining the identity of an individual. The social theory of the Common Knowledge Effect brings users together that have commonality. After just one identity is compromised within a network, it becomes easier to infer the identities of other group members based upon the discovered user's profile. As such, protecting the graph cardinality is just as important as maintaining anonymized members.

The problem becomes worse as a member is connected to multiple communities. As the number of connections to other communities becomes known, the probability of determining who the person is within the social environment increases.

BRIEF SUMMARY

Disclosed is an approach to enable the introduction of community scrambling and "noise" into a collection of social network data to protect against identity discovery. The solution includes the utilization of non-invertible graph splices, including insertions into multiple communities or single communities and scrambling. In addition, fabricated communities or new classes of graphs are injected into the data. Information is never deleted from the social network data which ensures that the algorithm is not lossy. All original data is preserved through the implementation of a cardinality key.

In one aspect, the invention provides a method for morphing social network data, comprising: providing a set of social network data have M communities, wherein each of the M communities includes a set of members; splitting up the M communities into N split communities; morphing the N split communities into P morphed communities using a cardinality key, wherein the cardinality key causes subsets of split communities to be unioned together; and adding phony members into the P morphed communities.

In a second aspect, the invention provides a system for morphing social network data, comprising: a system for splitting up M communities within a set of social network data into N split communities; a system for morphing the N split communities into P morphed communities using a cardinality key, wherein the cardinality key causes subsets of split communities to be unioned together; and a system for adding phony members into the P morphed communities.

In a third aspect, the invention provides a non-transitory computer readable storage medium having a program product stored thereon for morphing social network data, comprising: program code for splitting up M communities within a set of social network data into N split communities; program code for morphing the N split communities into P morphed communities using a cardinality key, wherein the cardinality key causes subsets of split communities to be unioned together; and program code for adding phony members into the P morphed communities.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

FIG. 4 depicts the database of FIG. 2 with randomly split communities in accordance with an embodiment of the present invention.

FIG. 5 depicts a cardinality key for scrambling split communities in accordance with an embodiment of the present invention.

FIG. 6 depicts the database of FIG. 4 with scrambled communities in accordance with an embodiment of the present invention.

FIG. 7 depicts the database of FIG. 6 with added members in accordance with an embodiment of the present invention.

Figure 1:
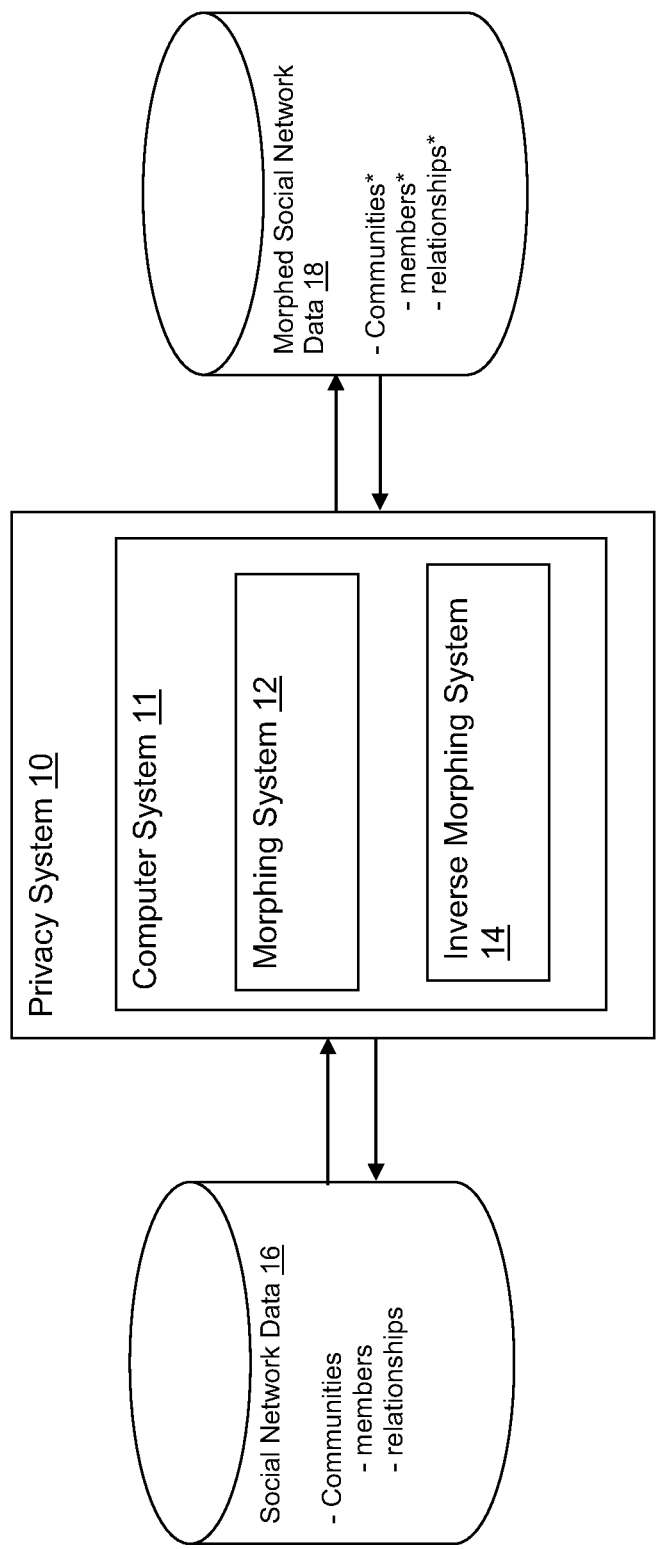
FIG. 1 depicts a privacy system for morphing social network data in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

FIG. 1 depicts a privacy system 10 for processing social network data 16 and generating morphed social network data 18. In general, social network data 16 includes a set of communities, with each community having members, and those members having relationships with other members within and outside of the communities. Communities may be formed in any manner from a pool of members having a common criterion, whether implicitly or explicitly, e.g., a community may be comprised of members who have common interests, members who have similar purchase histories, members who view the same content, members that belong to the same organization, members that work at the same company, members that are signed up to follow the same social network page, play the same games, etc. Relationships are generally defined as direct connections between members. For example, a user may be a member in one community (and thus be related to each member in the community—i.e., interrelated) and be friends with users in another community (i.e., intra-related). Intra-related relationships may include users that are friends, have a history of instant messaging, texting or emailing each other, etc.

As noted, social network data 16 is susceptible to identity discovery of the members by analyzing communities, members and their relationships. To address this issue, privacy system 10 provides a morphing system 12 that introduces "noise" into the data to effectively eliminate this possibility. The result is morphed social network data 18 that includes new and altered communities, members and relationships. Information is however never removed from the original social network data 16, which ensures that the process is not lossy. If needed, an inverse morphing system 14 may be provided to eliminate the noise and return the morphed social network data 18 back to its original state.

Figure 2:
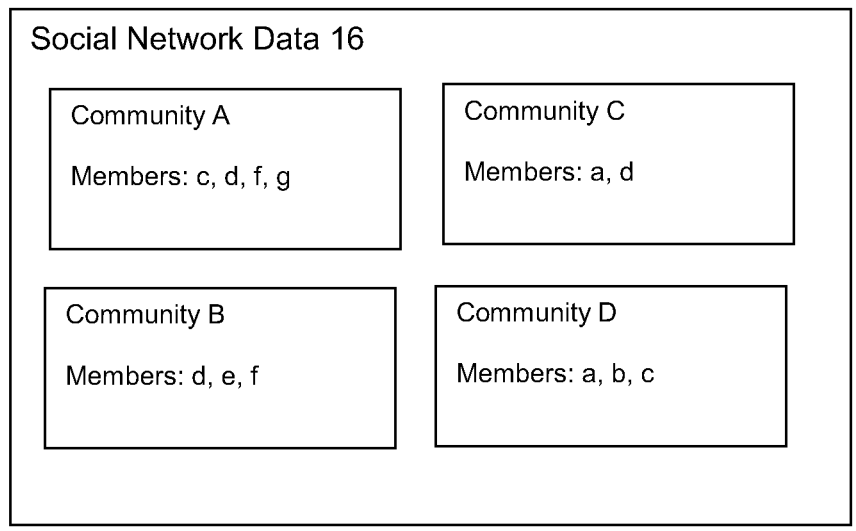
FIG. 2 depicts an example of a social network database in accordance with an embodiment of the present invention.
Figure 3:
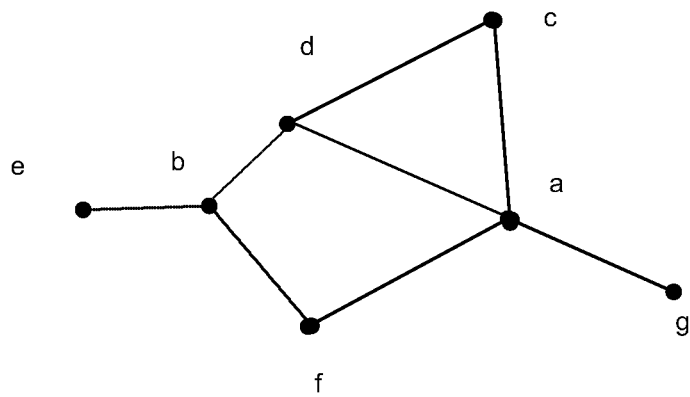
FIG. 3 depicts a membership graph structure of the social network database of FIG. 2 in accordance with an embodiment of the present invention.

An illustrative embodiment of morphing of social network data 16 into morphed social network data 18 is described with reference to FIGS. 2-9. FIG. 2 depicts an example of a set of social network data 16 that includes four communities A, B, C, D. Each community has a set of members, e.g., community A has members c, d, f, g; community B has members d, e, f, etc. FIG. 3 shows a corresponding graph of the four communities. As can be seen, community A, which has members c, d, f, g are all linked to member a; community B, which has members d, e, f are linked to member b, etc.

The first procedure of the morphing process randomly splits the communities, as for example is shown in FIG. 4. In this example, community A has been split into three communities 1, 2, and 3 (also shown as A1, A2, A3). Community B has been split into communities 5 and 6 (B1, B2); community C remains unchanged as community 4 (C1); and community D has been split into communities 7 and 8 (D1, D2). Note that the ordering of the communities is also changed, namely community C1 was moved ahead of community B1 and B2. The result is a set of data with randomly split communities 20, in this case eight split communities (1-8) that replaced the four original communities (A-D). Note that a splitting map may be maintained by privacy system 10 (FIG. 1) to track how the original communities were randomly split, in the event inverse morphing system 14 is to be implemented.

Next, a cardinality key 22 (FIG. 5) is applied to the eight split communities. In this example the cardinality key 22 is an N×N matrix where N is the number of split communities. Each column in the matrix includes a value of "1" randomly or selectively placed at one of the eight vertical locations. For instance, the first column has a "1" placed at position 2, the second column has a "1" placed at position 5, the third column has a "1" placed at position 2, etc. The result is a 1×8 mapping key associated with the cardinality key 22 is represented as [2 5 2 1 1 2 5 8].

Each row of the associated matrix then dictates how the split communities are to be morphed. In particular, each row of the matrix is used to generate a newly formed morphed community. For example, row one has a "1" at positions 4 and 5, which dictates that a newly formed morphed community (community 1') is to be formed from the union of split communities 4 and 5; row two has a "1" at positions 1, 3, and 6, which dictates that a newly formed morphed community (community 2') is to be formed from the union of split communities 1, 3, and 6; row three has no "1s", so no new community 3' is formed; and so on. The resulting newly formed morphed communities 24, along with their respective members, are shown in FIG. 6, and include communities 2', 5', 1', and 8'. Note that the ordering of the morphed communities has been scrambled.

The cardinality key 22 defines the mapping between the split communities (FIG. 4) and the morphed communities 24 (FIG. 6). The morphed communities 24 are social networks that have been altered according to the cardinality key 22. The application of the cardinality key 22 to the original communities is non-invertible. Note that while the cardinality key is generally described as a matrix, it is understood that the term "matrix" may refer to any data structure that performs a comparable mapping. Accordingly, for instance, the row and column axis's that make up the N×N matrix within the cardinality key can be switched.

Figure 8:
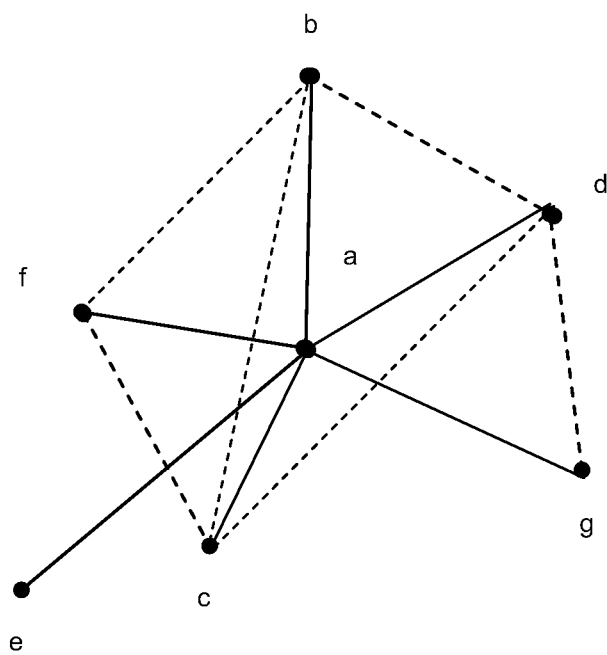
FIG. 8 depicts a morphed membership graph structure for the database of FIG. 6.

FIG. 8 shows the resulting graph structure of the morphed communities 24, and is significantly different from the original graph structure shown in FIG. 3. As can be seen in FIGS. 3 and 8, each community is represented by a social graph. The graph includes a plurality of nodes that represent a member or feature(s) with edges being relationships. Each generated sub-community is mapped to a composite morphed community 24. The mapping between sub-communities to composite communities produces morphed communities 24. The actual mapping is provided by the cardinality key 22.

Next, as shown in FIG. 7, "phony" members are added to the morphed communities to provide a set of morphed communities with randomly added members 26. Additional members may be added using an "additive key". The additive key may be represented as a magnitude vector, e.g., [1 0 4 1], which indicates how many new members should be added to each morphed community. In the case, the morphed communities 24 have magnitudes represented as [4 2 4 2] (i.e., the number of members in each community). The resulting magnitude [5 2 8 3] dictates the total number of members that will be in each community. Accordingly, community 2' requires the addition of one new member x; community 5' requires the addition of no new members; community 1' requires the addition of four new members w, x, y and z; and community 8' requires the addition of one new member z. Newly added phony members may be selected in any fashion, and may for example comprise made up or existing members.

In addition, phony members may be marked or salted, e.g., using a steganographic technique. Accordingly, in the event inverse morphing is implemented, phony members can be identified and removed.

Figure 9:
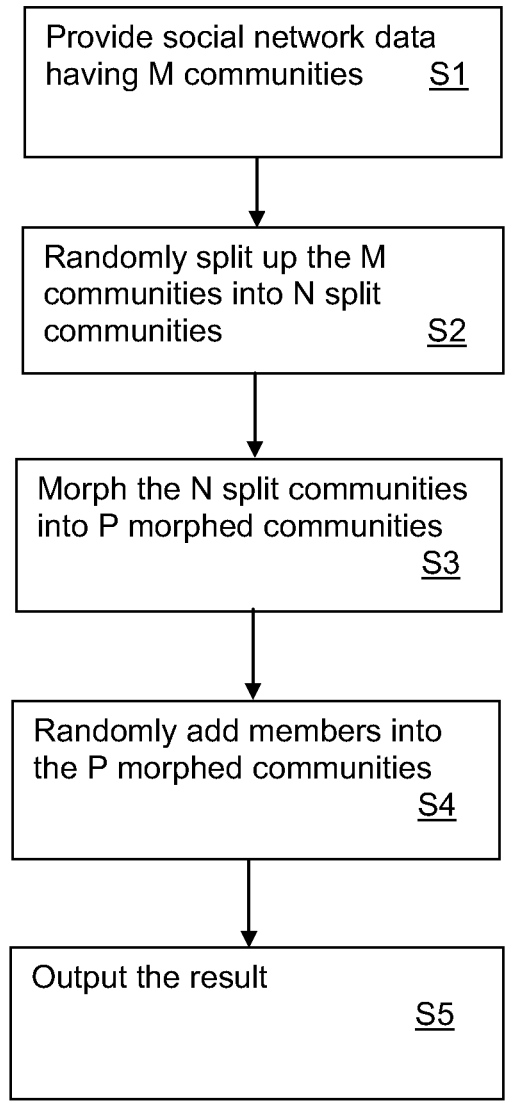
FIG. 9 depicts a flow diagram showing an illustrative process for morphing social network data in accordance with an embodiment of the present invention.

FIG. 9 depicts a flow diagram describing subsystems, program code or a process for implementing the morphing system 12 of FIG. 1. First, at S1, a set of social network data 16 having M communities is provided. At S2, the M communities are randomly split up into N split communities. Next at S3, N split communities are morphed into P morphed communities using a cardinality key. At S4, phony members are randomly added to into the P morphed communities using, e.g., an additive key. At S5, the result is outputted.

Figure 10:
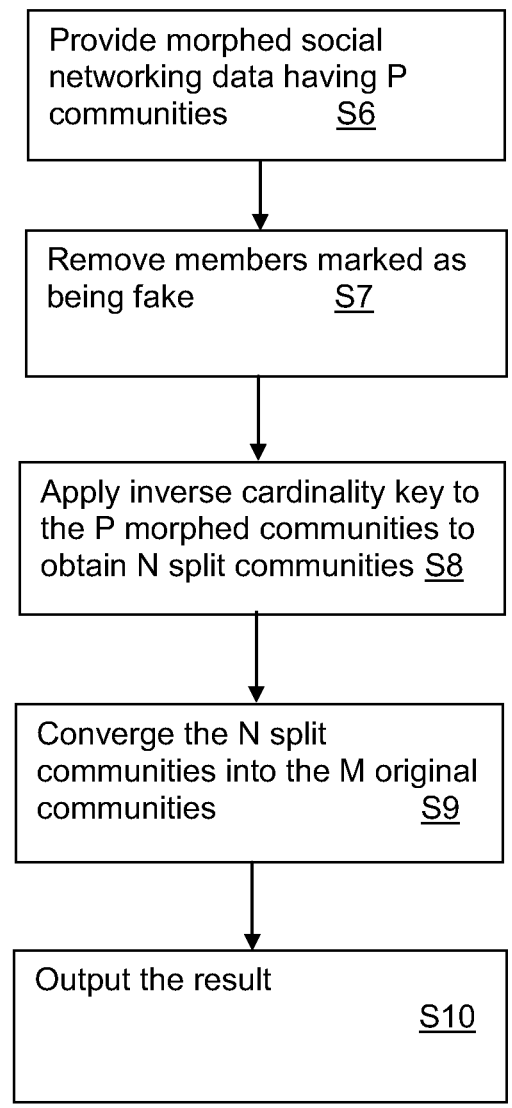
FIG. 10 depicts a flow diagram showing an illustrative process for inverse morphing social network data in accordance with an embodiment of the present invention.

FIG. 10 depicts a flow diagram describing subsystems, program code or a process for implementing the inverse morphing system 14 of FIG. 1. First, at S6, a set of morphed social network data having P communities is provided. At S7, members marked as being phony are removed. As noted above, such members may be marked using a steganographic technique. Next at S8, the inverse cardinality key is applied to the P morphed communities to obtain N split communities. The inverse cardinality key may, e.g., comprise an inverse matrix to the one used to morph the split communities. At S9, the N split communities are converged into the original M communities. The converging of split communities may be done with a splitting map (as noted above) that tracks how the M communities were originally split. At S10, the results are outputted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for morphing social network data, comprising: providing, using a computer hardware device, a set of social network data having a plurality of M communities, wherein each of the M communities includes a set of more than one members;
splitting up, using the computer hardware device, the M communities into N split communities, wherein each of the split communities is different from any of the communities;
morphing, using the computer hardware device, by joining the N split communities into a plurality of P morphed communities using a cardinality key, wherein the cardinality key causes subsets of split communities to be unioned together, wherein each of the morphed communities is different from any of the communities, wherein the cardinality key can be represented as an N×N matrix in which each vector along a first axis includes a value in only one of the N positions, and wherein each vector along a second axis dictates which of the N split communities are to be unioned together to form a morphed community;
and adding, using the computer hardware device, at least one phony member into each of the P morphed communities.

2. The method of claim 1, wherein splitting up the M communities includes randomly splitting up the M communities.

3. The method of claim 1, wherein phony members are marked so that their additions can be reverted.

4. The method of claim 3, wherein the phony members are marked using a steganographic technique.

5. The method of claim 1, wherein each of the M communities associates members together according to a common criterion.

6. A system for morphing social network data, comprising:
a computer hardware device, including:
a system for providing a set of social network data having a plurality of M communities, wherein each of the M communities includes a set of more than one members;
a system for splitting up M communities into N split communities, wherein each of the split communities is different from any of the communities;
a system for morphing by joining the N split communities into a plurality of P morphed communities using a cardinality key, wherein the cardinality key causes subsets of split communities to be unioned together, wherein each of the morphed communities is different from any of the communities, wherein the cardinality key comprises an N×N matrix in which each column includes a value in only one of the N positions, and wherein each row dictates which of the N split communities are to be unioned together to form a morphed community; and a system for adding at least one phony member into each of the P morphed communities.

7. The system of claim 6, wherein the system for splitting randomly divides the M communities.

8. The system of claim 6, wherein phony members are marked so that their additions can be reverted.

9. The system of claim 8, wherein the phony members are marked using a steganographic technique.

10. The system of claim 6, wherein each of the M communities are comprised of members having a common criterion.

11. A non-transitory computer readable storage medium having a program product thereon for morphing social network data, comprising:
program code for providing a set of social network data having a plurality of M communities, wherein each of the M communities includes a set of more than one members;
program code for splitting up M communities into N split communities, wherein each of the split communities is different from any of the communities;
program code for morphing by joining the N split communities into a plurality of P morphed communities using a cardinality key, wherein the cardinality key causes subsets of split communities to be unioned together, wherein each of the morphed communities is different from any of the communities, wherein the cardinality key comprises an N×N matrix in which each vector along a first axis includes a value in only one of the N positions, wherein each vector along a second axis dictates which of the N split communities are to be unioned together to form a morphed community; and
program code for adding at least one phony member into each of the P morphed communities.

12. The computer readable storage medium of claim 11, wherein the M communities are randomly divided.

13. The computer readable storage medium of claim 11, wherein phony members are marked using a steganographic technique so that their additions can be reverted.

14. The computer readable storage medium of claim 11, further comprising an inverse morphing system for converting morphed social network data back to an original set of social network data.

* * * * *